United States Patent
Wang

(10) Patent No.: US 12,272,325 B2
(45) Date of Patent: Apr. 8, 2025

(54) DRIVING METHOD OF DISPLAY DEVICE AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Baojun Wang, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/611,538

(22) PCT Filed: Oct. 13, 2021

(86) PCT No.: PCT/CN2021/123504
§ 371 (c)(1),
(2) Date: Mar. 30, 2023

(87) PCT Pub. No.: WO2023/044989
PCT Pub. Date: Mar. 30, 2023

(65) Prior Publication Data
US 2024/0046897 A1 Feb. 8, 2024

(30) Foreign Application Priority Data
Sep. 27, 2021 (CN) .......................... 202111137627.8

(51) Int. Cl.
G09G 3/36 (2006.01)
G06V 10/60 (2022.01)
G06V 10/75 (2022.01)

(52) U.S. Cl.
CPC .......... *G09G 3/3607* (2013.01); *G06V 10/60* (2022.01); *G06V 10/751* (2022.01); *G09G 2330/023* (2013.01)

(58) Field of Classification Search
None
See application file for complete search history.

(56) References Cited

U.S. PATENT DOCUMENTS

2006/0221030 A1  10/2006  Shih et al.
2019/0172398 A1*  6/2019  Shin .................... G09G 3/3266
(Continued)

FOREIGN PATENT DOCUMENTS

CN  101609653 A  12/2009
CN  104009064 A  8/2014
(Continued)

OTHER PUBLICATIONS

Chinese Journal of Liquid Crystals and Displays Issue 4 Apr. 15, 2019 Pixel design for decreasing data load Su, Qiujie etc.
(Continued)

*Primary Examiner* — Andre L Matthews
(74) *Attorney, Agent, or Firm* — PV IP PC; Wei Te Chung

(57) ABSTRACT

An embodiment of the present application discloses a driving method of a display device and a display device. The driving method includes driving steps: step S100: acquiring a first image information and a second image information; step S200: determining whether the current frame image belongs to a dynamic image; step S300: determining whether the current frame image is a heavy load image
(Continued)

according to the image information of the current frame image in the dynamic image; and step S400: performing a grayscale energy-saving driving on a corresponding heavy load sub-pixel according to the image information of the heavy load image.

14 Claims, 3 Drawing Sheets

(56) References Cited

U.S. PATENT DOCUMENTS

| | | | |
|---|---|---|---|
| 2022/0038652 A1* | 2/2022 | Chen | G09G 3/3685 |
| 2022/0246078 A1* | 8/2022 | Chuang | G09G 3/2074 |
| 2023/0274681 A1* | 8/2023 | Nishio | G09G 3/3291 345/55 |

FOREIGN PATENT DOCUMENTS

| | | |
|---|---|---|
| CN | 104539917 A | 4/2015 |
| CN | 106782421 A | 5/2017 |
| CN | 107170403 A | 9/2017 |
| CN | 109144200 A | 1/2019 |
| CN | 109272951 A | 1/2019 |
| CN | 109360534 A | 2/2019 |
| CN | 109658877 A | 4/2019 |
| CN | 110264969 A | 9/2019 |
| CN | 112885277 A | 6/2021 |
| CN | 113380209 A | 9/2021 |
| JP | 2011205714 A | 10/2011 |
| JP | 2016031431 A | 3/2016 |
| KR | 20080000340 A | 1/2008 |
| KR | 20080090139 A | 10/2008 |
| WO | 2020107656 A1 | 6/2020 |

OTHER PUBLICATIONS

International Search Report in International application No. PCT/CN2021/123504, mailed on Jun. 23, 2022.

Written Opinion of the International Search Authority in International application No. PCT/CN2021/123504, mailed on Jun. 23, 2022.

Chinese Office Action issued in corresponding Chinese Patent Application No. 202111137627.8 dated Nov. 17, 2022, pp. 1-6.

* cited by examiner

DRIVING METHOD OF DISPLAY DEVICE AND DISPLAY DEVICE

RELATED APPLICATIONS

This application is a Notional Phase of PCT Patent Application No. PCT/CN2021/123504 having international filing date of Oct. 13, 2021, which claims the benefit of priority of Chinese Patent Application No. 202111137627.8 filed on Sep. 27, 2021. The contents of the above applications are all incorporated by reference as if fully set forth herein in their entirety.

FIELD OF INVENTION

The present application relates to display fields, in particular to a driving method of a display device and a display device.

BACKGROUND OF INVENTION

With the development of display technology, people's demand for high-resolution and high-frequency display images become higher and higher, which will increase the load of a driving chip. In particular, when a same data line drives adjacent sub-pixels in the case of displaying a heavy load image, different sub-pixels in a same column are frequently switched back and forth between high-brightness driving and low-darkness driving.

However, when the data line drives different sub-pixels in the same column to frequently switch back and forth between high-brightness driving and low-darkness driving, the driving chip is in a high load state, which not only causes excessive high temperature and causes damage to the driving chip, but also causes a large consumption of current, thereby increasing the power consumption of the display device.

SUMMARY OF INVENTION

Technical Problem

Embodiments of the present application provide a driving method of a display device and a display device, which may solve a problem that a driving chip in a high load state under a heavy load image is damaged due to an excessively high temperature, and may solve a problem that current consumption is large and power consumption of the display device is high.

Technical Solution

An embodiment of the present application provides a driving method of a display device, comprising following driving steps:
step S100: acquiring a first image information and a second image information, wherein the first image information is image information of a current frame image, and the second image information is image information of a frame image before the current frame image;
step S200: determining whether the current frame image belongs to a dynamic image according to the first image information and the second image information;
step S300: determining whether the current frame image is a heavy load image according to the image information of the current frame image in the dynamic image, and acquiring pixel information of a heavy load sub-pixel in the heavy load image; and.
step S400: performing a grayscale energy-saving driving on a corresponding heavy load sub-pixel according to the image information of the heavy load image.

Alternatively, in some embodiments of the present application, the grayscale energy-saving driving comprises: reducing a difference between grayscale values of the heavy load sub-pixel and adjacent sub-pixels in a same column.

Alternatively, in some embodiments of the present application, a method of reducing the difference between the grayscale values of the heavy load sub-pixel and the adjacent sub-pixels in the same column is represented by a following calculation formula:

$$a+2b=1,\ a>0,\ b>0,\ a\geq b$$

wherein a denotes a grayscale change weight of the heavy load sub-pixel, and b denotes grayscale change weights of adjacent sub-pixels in a previous row and adjacent sub-pixels in a next row.

Alternatively, in some embodiments of the present application, in the step S100, the first image information comprises a first average luminance value, and the first average luminance value is an average luminance value of the current frame image; and
the second image information comprises a second average luminance value, the second average luminance value is an average luminance value of the frame image before the current frame image.

Alternatively, in some embodiments of the present application, in the step S200, the step of determining whether the current frame image belongs to the dynamic image according to the first image information and the second image information comprises:
comparing the first average luminance value and the second average luminance value, wherein when the second average luminance value is not equal to the first average luminance value, the current frame image is the dynamic image; when the second average luminance value is equal to the first average luminance value, the current frame image is a static image.

Alternatively, in some embodiments of the present application, in the step S300, the step of determining whether the current frame image is the heavy load image according to the image information of the current frame image in the dynamic image and acquiring the pixel information of the heavy load sub-pixel in the heavy load image comprises:
step S310: calculating a heavy load weight per pixel of the current frame image, wherein the calculation formula of the heavy load weight is expressed as:

$$W_N = \Sigma_{k=0}^{N} |R(i,j+k) - R(i+1,j+k)| + |G(i,j+k) - G(i+1,j+k)| + |B(i,j+k) - B(i+1,j+k)|$$

$$W_N > 3*NP,\ P \in (0,255),\ N > 30$$

wherein $W_N$ is a heavy load weight, i represents an i-th row pixels, i+1 represents an (i+1) row pixels, j represents a j-th column pixels, and j+k represents a (j+k)-th column pixels; R denotes a grayscale value of a red sub-pixel, G denotes a grayscale value of a green sub-pixel, B denotes a grayscale value of a blue sub-pixel, N denotes a range of pixel columns for calculating the heavy load weight, P denotes a grayscale difference, k is a positive integer, and 3*NP denotes a heavy load threshold; and
step S320: comparing the heavy load weight of each pixel with the heavy load threshold, wherein when the heavy load weight of the pixel is greater than the heavy load threshold, the pixel is the heavy load pixel; when the heavy load weight of the pixel is less than or equal to the heavy load threshold, the pixel is a non-heavy load pixel; and acquiring the pixel information of the heavy load sub-pixels in the heavy load pixel.

Alternatively, in some embodiments of the present application, a value of P is greater than or equal to (255*2)/3.

Alternatively, in some embodiments of the present application, a value of N is greater than or equal to 30 and is less than or equal to 120.

Alternatively, in some embodiments of the present application, the frame image before the current frame image is a frame image before m frames, and m is greater than 1 and is less than 5.

Accordingly, an embodiment of the present application further provides a display device, wherein the display device comprises a driving chip that performs a driving method of the display device, and the driving method of the display device comprising following driving steps:

step S100: acquiring a first image information and a second image information, wherein the first image information is image information of a current frame image, and the second image information is image information of a frame image before the current frame image;

step S200: determining whether the current frame image belongs to a dynamic image according to the first image information and the second image information;

step S300: determining whether the current frame image is a heavy load image according to the image information of the current frame image in the dynamic image, and acquiring pixel information of a heavy load sub-pixel in the heavy load image; and step S400: performing a grayscale energy-saving driving on a corresponding heavy load sub-pixel according to the image information of the heavy load image.

Alternatively, in some embodiments of the present application, the grayscale energy-saving driving comprises: reducing a difference between grayscale values of the heavy load sub-pixel and adjacent sub-pixels in a same column.

Alternatively, in some embodiments of the present application, a method of reducing the difference between the grayscale values of the heavy load sub-pixel and the adjacent sub-pixels in the same column is represented by a following calculation formula:

$$a+2b=1, a>0, b>0, a \geq b$$

wherein a denotes a grayscale change weight of the heavy load sub-pixel, and b denotes grayscale change weights of adjacent sub-pixels in a previous row and adjacent sub-pixels in a next row.

Alternatively, in some embodiments of the present application, in the step S100, the first image information comprises a first average luminance value, and the first average luminance value is an average luminance value of the current frame image; and the second image information comprises a second average luminance value, the second average luminance value is an average luminance value of the frame image before the current frame image.

Alternatively, in some embodiments of the present application, in the step S200, the step of determining whether the current frame image belongs to the dynamic image according to the first image information and the second image information comprises:

comparing the first average luminance value and the second average luminance value, wherein when the second average luminance value is not equal to the first average luminance value, the current frame image is the dynamic image; when the second average luminance value is equal to the first average luminance value, the current frame image is a static image.

Alternatively, in some embodiments of the present application, in the step S300, the step of determining whether the current frame image is the heavy load image according to the image information of the current frame image in the dynamic image and acquiring the pixel information of the heavy load sub-pixel in the heavy load image comprises:

step S310: calculating a heavy load weight per pixel of the current frame image, wherein the calculation formula of the heavy load weight is expressed as:

$$W_N = \Sigma_{k=0}^{N} |R(i,j+k) - R(i+1,j+k)| + |G(i,j+k) - G(i+1,j+k)| + |B(i,j+k) - B(i+1,j+k)|$$

$$W_N > 3*NP, P \in (0,255), N > 30$$

wherein $W_N$ is a heavy load weight, i represents an i-th row pixels, i+1 represents an (i+1) row pixels, j represents a j-th column pixels, and j+k represents a (j+k)-th column pixels; R denotes a grayscale value of a red sub-pixel, G denotes a grayscale value of a green sub-pixel, B denotes a grayscale value of a blue sub-pixel, N denotes a range of pixel columns for calculating the heavy load weight, P denotes a grayscale difference, k is a positive integer, and 3*NP denotes a heavy load threshold; and step S320: comparing the heavy load weight of each pixel with the heavy load threshold, wherein when the heavy load weight of the pixel is greater than the heavy load threshold, the pixel is the heavy load pixel; when the heavy load weight of the pixel is less than or equal to the heavy load threshold, the pixel is a non-heavy load pixel; and acquiring the pixel information of the heavy load sub-pixels in the heavy load pixel.

Alternatively, in some embodiments of the present application, a value of P is greater than or equal to (255*2)/3.

Alternatively, in some embodiments of the present application, a value of N is greater than or equal to 30 and is less than or equal to 120.

Alternatively, in some embodiments of the present application, the frame image before the current frame image is a frame image before m frames, and m is greater than 1 and is less than 5.

Advantageous Effects

In the embodiment of the present application, the embodiment of the present application provides a driving method of a display device and a display device. By determining the heavy load image and acquiring the pixel information of the heavy load sub-pixels of the heavy load image, the heavy load sub-pixels are driven by the grayscale energy-saving driving method, and by reducing the difference between the grayscale values of the heavy load sub-pixels and the adjacent sub-pixels in the same column, the voltage difference between the high-grayscale driving and the low-grayscale driving of the data line is reduced, thereby improving the high-load state of the driving chip under the heavy load image, avoiding the damage to the driving chip caused by excessive high temperature, reducing the consumption of the driving current, and reducing the power consumption of the display device.

DESCRIPTION OF DRAWINGS

In order to more clearly illustrate the technical solutions in the embodiments of the present application, the accompanying drawings required for use in the description of the embodiments will be briefly described below. It is apparent that the drawings in the following description are only some embodiments of the present disclosure. For those skilled in the art, without paying any creative work, other drawings may be obtained based on these drawings.

DETAILED DESCRIPTION OF EMBODIMENTS

Figure 1:
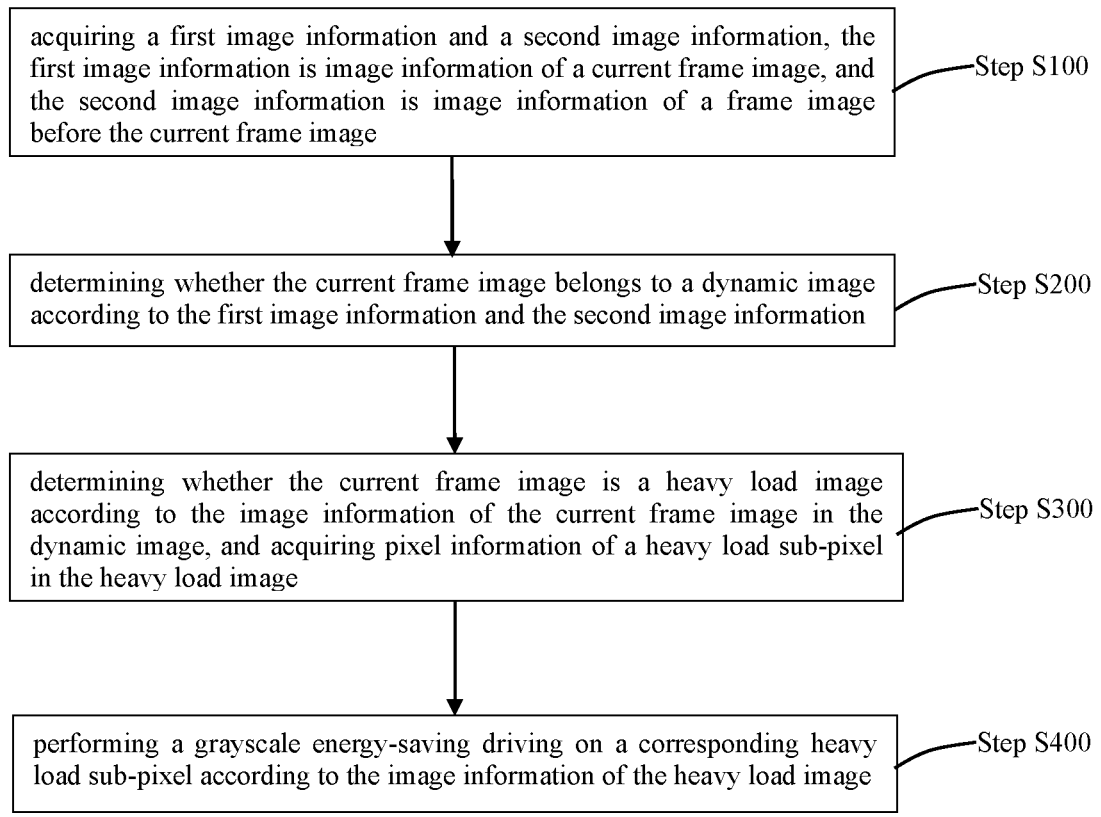
FIG. 1 is a schematic diagram of driving steps of a driving method of a display device according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application. In addition, it should be understood that the specific implementations described herein are intended only to illustrate and explain the present application and are not intended to limit the present application. In the description of the present invention, In the present disclosure, unless otherwise stated, directional words used such as "upper" and "lower" generally refer to the upper and lower directions of the device in actual use or working state, and specifically refer to the drawing directions in the drawings; and "inner" and "outer" refer to the outline of the device.

An embodiment of the present application provides a driving method of a display device, comprising the following driving steps: Step S100: acquiring a first image information and a second image information, the first image information is an image information of a current frame image, the second image information is an image information of a frame image before the current frame image; Step S200: determining whether the current frame image belongs to a dynamic image according to the first image information and the second image information; Step S300: determining whether the current frame image is a heavy load image according to the image information of the current frame image in the dynamic image, and acquiring pixel information of a heavy load sub-pixel in the image; Step S400: performing a grayscale energy-saving driving on a corresponding heavy load sub-pixels according to the image information of the heavy load image.

Embodiments of the present application provide a driving method of a display device and a display device. Detailed description will be given below. It should be noted that the order of description of the following embodiments is not a limitation on the preferred order of the embodiments.

Embodiment 1

Figure 2:
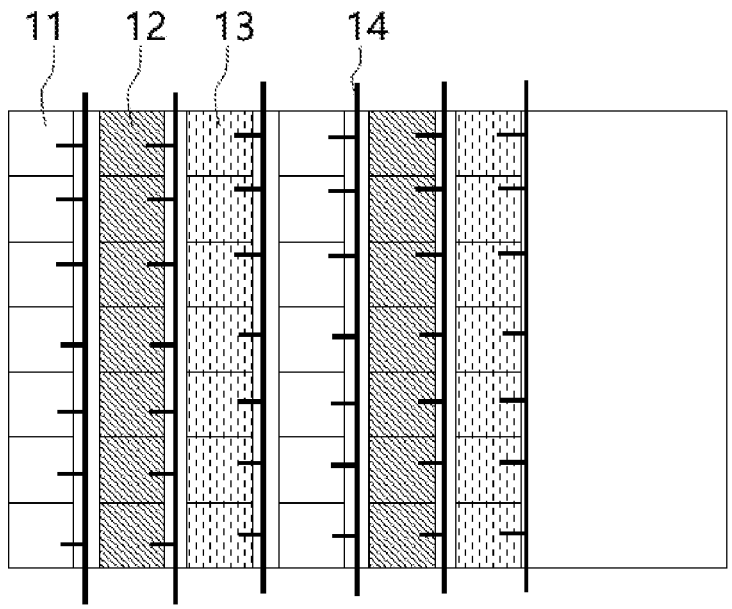
FIG. 2 is a schematic diagram of pixel arrangement of a display device according to an embodiment of the present application.
Figure 3:
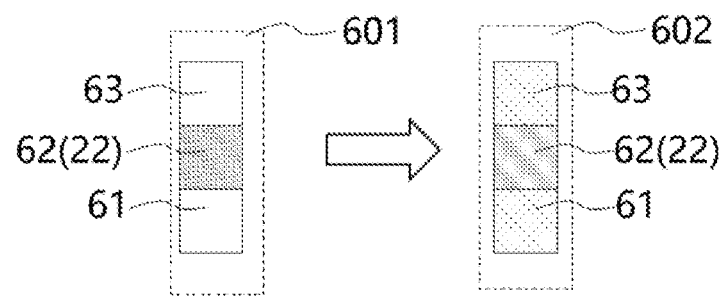
FIG. 3 is a schematic diagram of an improvement process of a heavy load sub-pixel according to an embodiment of the present application.
Figure 4:
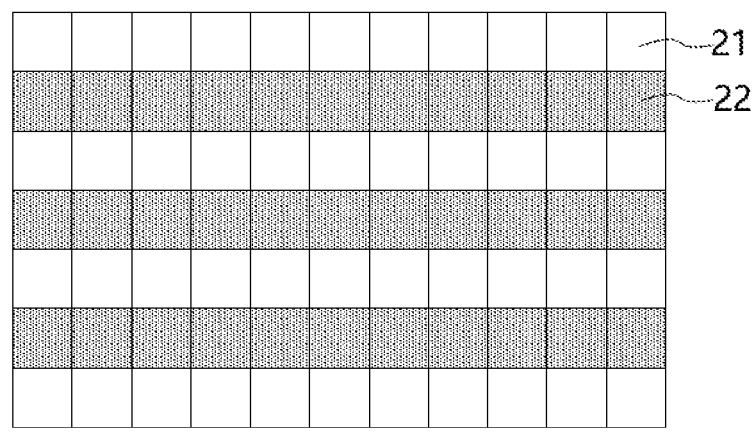
FIG. 4 is a schematic diagram of a heavy load image of a display device according to an embodiment of the present application.
Figure 5:
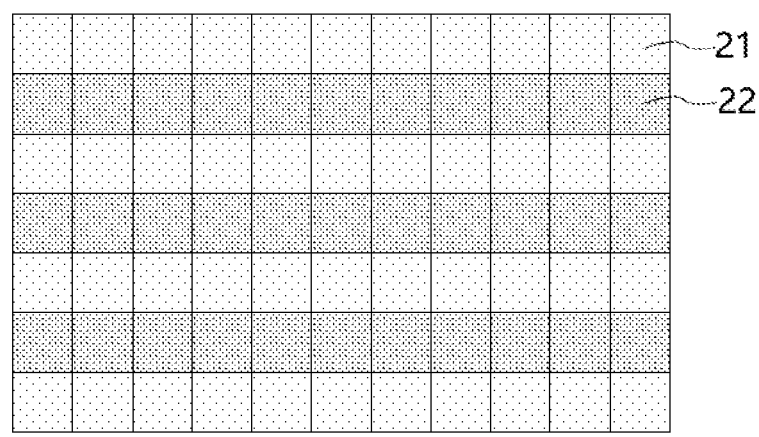
FIG. 5 is a schematic diagram after improving a heavy load image of a display device according to an embodiment of the present application.
Figure 6:
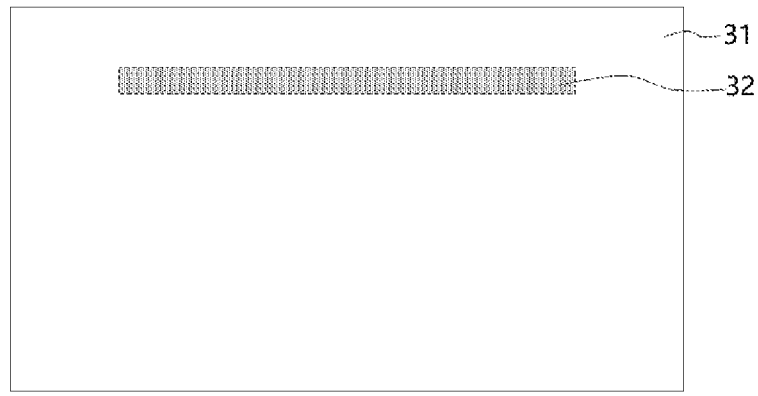
FIG. 6 is a schematic diagram of a local heavy load image of a display device according to an embodiment of the present application.
Figure 7:
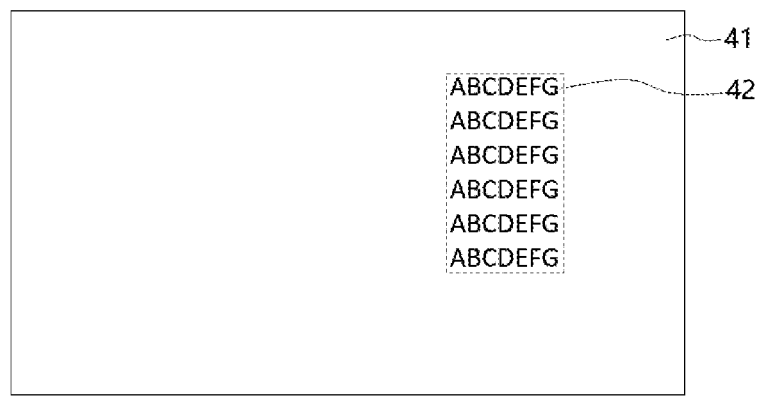
FIG. 7 is a schematic diagram of displaying a text image of a display device according to an embodiment of the present application.

Referring to FIG. 1, FIG. 2, FIG. 3, FIG. 4, FIG. 5, FIG. 6, and FIG. 7, FIG. 1 is a schematic diagram of driving steps of a driving method of a display device according to an embodiment of the present application, FIG. 2 is a schematic diagram of pixel arrangement of a display device according to an embodiment of the present application, FIG. 3 is a schematic diagram of an improvement process of a heavy load sub-pixel according to an embodiment of the present application, FIG. 4 is a schematic diagram of a heavy load image of a display device according to an embodiment of the present application, FIG. 5 is a schematic diagram after improving a heavy load image of a display device according to an embodiment of the present application, FIG. 6 is a schematic diagram of a local heavy load image of a display device according to an embodiment of the present application, and FIG. 7 is a schematic diagram of displaying a text image of a display device according to an embodiment of the present application.

Referring to FIG. 1, an embodiment of the present application provides a driving method of a display device, comprising the following driving steps: step S100, step S200, step S300, and step S400.

Step S100: acquiring a first image information and a second image information, the first image information is an image information of a current frame image, and the second image information is an image information of a frame image before the current frame image.

Step S200: determining whether the current frame image belongs to a dynamic image according to the first image information and the second image information.

Step S300: determining whether the current frame image is a heavy load image according to the image information of the current frame image in the dynamic image, and acquiring pixel information of a heavy load sub-pixel in the image.

Step S400: performing a grayscale energy-saving driving on the corresponding heavy load sub-pixels according to the image information of the heavy load image.

Specifically, referring to FIG. 2, a 1 gate 1 data (1G1D) pixel driving architecture is illustrated. The display device includes a plurality of columns of first sub-pixels 11, a plurality of columns of second sub-pixels 12, and a plurality of columns of third sub-pixels 13. The first sub-pixels 11 in each column are driven through a corresponding data line 14, the second sub-pixels 12 in each column are driven through a corresponding data line 14, and the third sub-pixels 13 in each column are driven through a corresponding data line 14. The first sub-pixels 11 may be red sub-pixels, the second sub-pixels 12 may be green sub-pixels, and the third sub-pixels 13 may be blue sub-pixels.

Specifically, the static image refers to a display content in which a displayed image does not change during a period of time, and a dynamic image refers to the display content in which the displayed image constantly changes during a period of time.

Specifically, the second image information is an image information of a previous frame image before the current frame image. The second image may be a previous frame image, the second image may be a previous frame image of the previous frame image, and so on, which will not be listed here.

Specifically, referring to FIG. 4, the sub-pixels in a same column includes alternating heavy load sub-pixels 22 and adjacent sub-pixels 21, a grayscale difference or a brightness difference between the heavy load sub-pixel 22 and the sub-pixel 21 adjacent to the heavy load sub-pixel 22 is very large. When the data line 14 drives the heavy load sub-pixels 22 and adjacent sub-pixels 21 in the same column, the data line needs to be frequently switched back and forth between the high-brightness driving and the low-darkness driving. For example, the grayscale of the heavy load sub-pixel 22 is 255, the grayscale of the adjacent sub-pixel 21 is 0, when the display device is driven row by row, the data line 14 needs to be frequently switched back and forth between the 255 grayscale driving and the 0 grayscale driving. That is, the voltage variation range of the same data line is very large while driving one frame image. At this time, the driving chip is in a high load state, which not only causes excessive high temperature and causes damage to the driving chip, but also causes a large consumption of current, thereby increasing the power consumption of the display device.

In some embodiments, the grayscale energy-saving driving includes reducing the difference in grayscale values between the heavy load sub-pixels and adjacent sub-pixels in the same column.

Specifically, referring to FIG. 3, the filling degree of sub-pixels in FIG. 3 indicates the difference in grayscale. As a state 601 before the grayscale energy-saving driving shown in FIG. 3, a fourth sub-pixel 61, a fifth sub-pixel 62, and a sixth sub-pixel 63 are sequentially arranged in column. The fourth sub-pixel 61, the fifth sub-pixel 62, and the sixth sub-pixel 63 are driven by a same data line, the fifth sub-pixel 62 is a heavy load sub-pixel, the fourth sub-pixel 61 is an adjacent sub-pixel located in a previous row of sub-pixels before the fifth sub-pixel 62, and the sixth sub-pixel 63 is an adjacent sub-pixel located in a next row of sub-pixels after the fifth sub-pixel 62.

Specifically, referring to FIG. 3, as shown in state 602 after the grayscale energy-saving driving in the drawing, the grayscale energy-saving driving includes reducing the difference between the grayscale values of the heavy load sub-pixels 22 and the adjacent sub-pixels in the same column, while keeping the overall luminance of the heavy load sub-pixels 22 and the adjacent sub-pixels in the same column unchanged, that is, reducing the difference between the grayscale values of the fifth sub-pixels 62 (the fifth sub-pixels 62 is the heavy load sub-pixel) and the sixth sub-pixels 63 and the fourth sub-pixels 61, and keeping the overall luminance of the fourth sub-pixels 61, the fifth sub-pixels 62, and the sixth sub-pixels 63 unchanged.

In some embodiments, the method of reducing the difference in grayscale values between the heavy load sub-pixels and adjacent sub-pixels in the same column is represented by the following calculation formula:

$$a+2b=1, a>0, b>0, a \geq b$$

wherein a represents the grayscale change weight of the heavy load sub-pixel, and b represents the grayscale change weight of the adjacent sub-pixels in the previous row and the adjacent sub-pixels in the next row.

Specifically, referring to FIG. 3, a denotes grayscale change weight of the heavy load sub-pixel 22 (the fifth sub-pixel 62 is the heavy load sub-pixel) and b denotes grayscale change weights of adjacent sub-pixels (the fourth sub-pixel 61) in the previous row and adjacent sub-pixels (the sixth sub-pixel 63) in the next row.

Specifically, a+2b=1, which keeps the overall brightness of the heavy load sub-pixels and the adjacent sub-pixels in the same column unchanged before and after the grayscale energy-saving driving, that is, keeps the overall brightness of the fourth sub-pixels 61, the fifth sub-pixels 62, and the sixth sub-pixels 63 unchanged before and after the grayscale energy-saving driving.

In some embodiments, in step S100, the first image information includes a first average luminance value, which is the average luminance value of the current frame image; the second image information includes a second average luminance value, which is an average luminance value of a previous frame image before the current frame image.

Specifically, the first average luminance value refers to the average luminance value of the current frame image, that is, the average pixel luminance value (APL) of the current frame image. The second average luminance value is an average luminance value of one frame image before the current frame image, that is, an average pixel luminance value (APL) of one frame image before the current frame image.

In some embodiments, in step S200, determining whether the current frame image belongs to the dynamic image according to the first image information and the second image information includes: comparing the first average luminance value and the second average luminance value, if the second average luminance value is not equal to the first average luminance value, the current frame image is a dynamic image; if the second average luminance value is equal to the first average luminance value, the current frame image is a static image.

Specifically, the average pixel luminance value (APL) of the current frame image is compared with the average pixel luminance value (APL) of the previous frame image before the current frame image, the current frame image is the dynamic image if the second average luminance value is not equal to the first average luminance value, if the second average luminance value is equal to the first average luminance value, the current frame image is a static image.

Specifically, for example, the second average luminance value is an average luminance value of a previous frame image before the previous frame image, for example, the second average luminance value is an average luminance value of a previous frame image before the previous frame image of the previous frame image, and so on, all of which are not listed here.

In some embodiments, in step S300, determining whether the current frame image is a heavy load image according to the image information of the current frame image in the dynamic image and acquiring the pixel information of the heavy load sub-pixel in the image includes step S310 and step S320.

In the step S310, a heavy load weight per pixel of the current frame image is calculated, and the calculation formula of the heavy load weight is expressed as:

$$W_N = \Sigma_{k=0}^{N} |R(i,j+k) - R(i+1,j+k)| + |G(i,j+k) - G(i+1,j+k)| + |B(i,j+k) - B(i+1,j+k)|$$

$$W_N > 3*NP, P \in (0,255), N > 30$$

where $W_N$ is a heavy load weight, i represents an i-th row pixels, i+1 represents an (i+1)-th row pixels, j represents a j-th column pixels, and j+k represents a (j+k)-th column pixels; R denotes a grayscale value of a red sub-pixel, G denotes a grayscale value of a green sub-pixel, B denotes a grayscale value of a blue sub-pixel, N denotes a range of pixel columns in which the heavy load weights are calculated, P denotes a grayscale difference, k is a positive integer, and 3*NP denotes a heavy load threshold.

In the step S320, the heavy load weight of each pixel is compared with the magnitude of the heavy load threshold. If the heavy load weight of the pixel is greater than the heavy load threshold, the pixel is the heavy load pixel. If the heavy load weight of the pixel is less than or equal to the heavy load threshold, the pixel is a non-heavy load pixel, and the pixel information of the heavy load sub-pixel in the heavy load pixel is acquired.

Specifically, the heavy load weight of each pixel is calculated according to the calculation formula of the heavy load weight $W_N$, and each pixel includes a red sub-pixel, a green sub-pixel, and a blue sub-pixel. If the heavy load weight $W_N$ is less than or equal to the heavy load threshold 3*NP, the pixel is the non-heavy load pixel; if the heavy load weight $W_N$ is greater than the heavy load threshold 3*NP, the pixel is the heavy load pixel and the sub-pixels included in the heavy load pixel are the heavy load sub-pixels.

Specifically, the magnitude of the heavy load threshold is related to the values of P and N.

Specifically, referring to FIGS. 4 and 5, the filling differences of the respective sub-pixels in FIGS. 4 and 5 represent the grayscale differences among the sub-pixels. Before adopting the driving method of the display device according to the embodiment of the present application, the grayscale difference between the heavy load sub-pixel 22 and its adjacent sub-pixel 21 in FIG. 4 is very large; after adopting the driving method of the display device according to the embodiment of the present application, the grayscale difference between the heavy load sub-pixel 22 and its adjacent sub-pixel 21 in FIG. 5 is reduced.

Specifically, referring to FIG. 6, in the image displayed by the display device, the heavy load region 32 is a part of the entire image region 31 of the display device. In the driving method of the display device according to the embodiment of the present application, both the entire image region of the display device and the local image region of the display device may be optimized and driven.

In some embodiments, the P value is greater than or equal to (255*2)/3.

Specifically, P denotes a grayscale difference, and the lowest grayscale is 0 grayscale, and the highest grayscale is 255, therefore the value of P is between 0 and 255.

In some embodiments, the N value is greater than or equal to 30, and the N value is less than or equal to 120.

Specifically, in a preferred embodiment of the present application, the P value is greater than or equal to (255*2)/3, the N value is greater than or equal to 30, and the N value is less than or equal to 120.

Specifically, referring to FIG. 7, the display content in FIG. 7 includes a non-text area 41 and a text area 42. When a displayed image includes text, if grayscale energy-saving driving is performed on an edge of an image such as text, the edge of the image such as text is distorted, for example, the contrast of the edge of the text is reduced, so that the text looks blurred. Therefore, in the embodiment of the present application, even if the edge of the image such as text includes a heavy load sub-pixel, it is not necessary to perform grayscale energy-saving driving on the edge of the image such as text. By taking the N value greater than or equal to 30 and the N value less than or equal to 120, so that when the heavy load weight $W_N$ of the heavy load pixel is calculated, the heavy load weight $W_N$ of the heavy load pixel is calculated to take into account the nearest pixels of more than 30 columns, the heavy load weight $W_N$ of the edge of the image such as text is averagely diluted or averagely reduced, the edge of the text in FIG. 7 may be eliminated from the heavy load area, and the pixels at the edge of the text may be eliminated from the heavy load pixels, so as to avoid the grayscale energy-saving driving from causing distortion or blurring of the edges of images such as text.

In some embodiments, a previous frame image before the current frame image is a frame image before m frames, m is greater than 1, and m is less than 5.

Specifically, the second image information is image information of a frame image before m frames, m is a positive integer, m is greater than 1, and m is less than 5. Specifically, in the embodiment of the present application, it is preferable that m is greater than 1 and m is less than 5, so that a judgment error of the static image and the dynamic image may be avoided, and an appropriate m value may be selected to accurately judge whether the current frame image is a dynamic image.

It should be noted that the pixel information of the heavy load sub-pixel may include position information and grayscale information of the heavy load sub-pixel.

In the embodiment of the present application, by determining the heavy load image and acquiring the pixel information of the heavy load sub-pixels of the heavy load image, the heavy load sub-pixels are driven by the grayscale energy-saving driving method, and by reducing the difference between the grayscale values of the heavy load sub-pixels and the adjacent sub-pixels in the same column, the voltage difference between the high-grayscale driving and the low-grayscale driving of the data line is reduced, thereby improving the high-load state of the driving chip under the heavy load image, avoiding damage to the driving chip caused by excessive high temperature, reducing the consumption of the driving current, and reducing the power consumption of the display device.

Embodiment 2

An embodiment of the present application further provides a display device 100 including a driving chip 103 that performs the driving method of the display device according to any one of the above embodiments.

Figure 8:
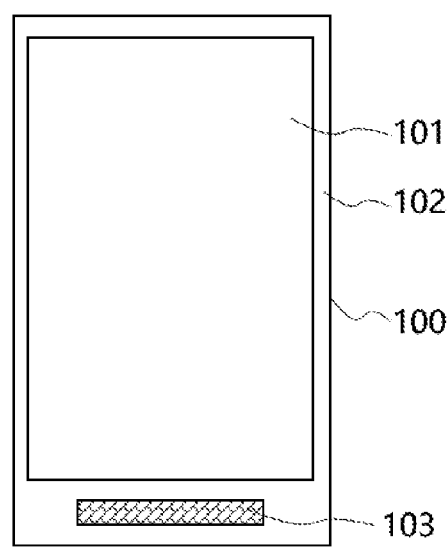
FIG. 8 is a schematic diagram of a display device according to an embodiment of the present application.

Referring to FIG. 8, FIG. 8 is a schematic diagram of a display device according to an embodiment of the present application, the display device 100 includes a display area 101 and a non-display area 102. The driving chip 103 may be directly soldered or bonded to the non-display area 102 of the display device 100. The driving chip 103 may be electrically connected to the display area 101 of the display device 100 through other components and structures, for example, the display device 100 is a television, the driving chip 103 may be arranged on an external circuit board, which is not limited here.

The driving method of the display device and the display device provided in the embodiments of the present application are described in detail. Specific examples are used in this article to illustrate the principles and implementations of the present disclosure. The description of the embodiments is merely intended to help understand the methods and core ideas of the present application. At the same time, a person skilled in the art may make changes in the specific embodiments and application scope according to the idea of the present application. In conclusion, the content of the specification should not be construed as a limitation to the present application.

What is claimed is:

1. A driving method of a display device, wherein the driving method comprises following steps:
   step S100: acquiring a first image information and a second image information, wherein the first image information is image information of a current frame image, and the second image information is image information of a frame image before the current frame image;
   step S200: determining whether the current frame image belongs to a dynamic image according to the first image information and the second image information;
   step S300: determining whether the current frame image is a heavy load image according to the image information of the current frame image in the dynamic image, and acquiring pixel information of a heavy load sub-pixel in the heavy load image; and
   step S400: performing a grayscale energy-saving driving on a corresponding heavy load sub-pixel according to the image information of the heavy load image;
   wherein the grayscale energy-saving driving comprises: reducing a difference between grayscale values of the heavy load sub-pixel and adjacent sub-pixels in a same column;
   wherein a method of reducing the difference between the grayscale values of the heavy load sub-pixel and the adjacent sub-pixels in the same column is represented by a following calculation formula:

$a+2b=1, a>0, b>0, a>b$ wherein a denotes a grayscale change weight of the heavy load sub-pixel, and b denotes grayscale change weights of adjacent sub-pixels in a previous row and adjacent sub-pixels in a next row.

2. The driving method of the display device according to claim 1, wherein in the step S100, the first image information comprises a first average luminance value, and the first average luminance value is an average luminance value of the current frame image; and
   the second image information comprises a second average luminance value, the second average luminance value is an average luminance value of the frame image before the current frame image.

3. The driving method of the display device according to claim 2, wherein in the step S200, the step of determining whether the current frame image belongs to the dynamic image according to the first image information and the second image information comprises:
   comparing the first average luminance value and the second average luminance value, wherein when the second average luminance value is not equal to the first average luminance value, the current frame image is the dynamic image; when the second average luminance value is equal to the first average luminance value, the current frame image is a static image.

4. The driving method of the display device according to claim 1, wherein the frame image before the current frame image is a frame image before m frames, and m is greater than 1 and less than 5.

5. A display device, wherein the display device comprises a driving chip that performs a driving method of the display device, and the driving method of the display device comprising following driving steps:

step S100: acquiring a first image information and a second image information, wherein the first image information is image information of a current frame image, and the second image information is image information of a frame image before the current frame image;
step S200: determining whether the current frame image belongs to a dynamic image according to the first image information and the second image information;
step S300: determining whether the current frame image is a heavy load image according to the image information of the current frame image in the dynamic image, and acquiring pixel information of a heavy load sub-pixel in the heavy load image; and
step S400: performing a grayscale energy-saving driving on a corresponding heavy load sub-pixel according to the image information of the heavy load image;
wherein the grayscale energy-saving driving comprises: reducing a difference between grayscale values of the heavy load sub-pixel and adjacent sub-pixels in a same column;
wherein a method of reducing the difference between the grayscale values of the heavy load sub-pixel and the adjacent sub-pixels in the same column is represented by a following calculation formula:

$a+2b=1, a>0, b>0, a>b$ wherein a denotes a grayscale change weight of the heavy load sub-pixel, and b denotes grayscale change weights of adjacent sub-pixels in a previous row and adjacent sub-pixels in a next row.

6. The display device according to claim 5, wherein in the step S100, the first image information comprises a first average luminance value, and the first average luminance value is an average luminance value of the current frame image; and
   the second image information comprises a second average luminance value, the second average luminance value is an average luminance value of the frame image before the current frame image.

7. The display device according to claim 6, wherein in the step S200, the step of determining whether the current frame image belongs to the dynamic image according to the first image information and the second image information comprises:
   comparing the first average luminance value and the second average luminance value, wherein when the second average luminance value is not equal to the first average luminance value, the current frame image is the dynamic image; when the second average luminance value is equal to the first average luminance value, the current frame image is a static image.

8. The display device according to claim 5, wherein in the step S300, the step of determining whether the current frame image is the heavy load image according to the image information of the current frame image in the dynamic image and acquiring the pixel information of the heavy load sub-pixel in the heavy load image comprises:
   step S310: calculating a heavy load weight per pixel of the current frame image, wherein the calculation formula of the heavy load weight is expressed as:

$W_N = \Sigma_{k=0}^{N} |(R(i,j+k)-R(i+1,j+k)| + |G(i,j+k)-G(i+1,j+k)| + |B(i,j+k)-B(i+1,j+k)|$ $W_N > 3*NP, P \in (0,255), N>30$ wherein $W_N$ is a heavy load weight, i represents an i-th row pixels, i+1 represents an (i+1) row pixels, j represents a j-th column pixels, and j+k represents a (j+k)-th column pixels; R denotes a grayscale value of a red sub-pixel, G denotes a grayscale value of a green sub-pixel, B denotes a grayscale value of a blue sub-pixel, N denotes a range of pixel columns for calculating the heavy load weight, P denotes a grayscale difference, k is a positive integer, and 3*NP denotes a heavy load threshold; and step S320: comparing the heavy load weight of each pixel with the heavy load threshold, wherein when the heavy load weight of the pixel is greater than the heavy load threshold, the pixel is the heavy load pixel; when the heavy load weight of the pixel is less than or equal to the heavy load threshold, the pixel is a non-heavy load pixel; and acquiring the pixel information of the heavy load sub-pixels in the heavy load pixel.

9. The display device according to claim 8, wherein a value of P is greater than or equal to (255*2)/3.

10. The display device according to claim 8, wherein a value of N is greater than or equal to 30 and the value of N is less than or equal to 120.

11. The display device according to claim 5, wherein the frame image before the current frame image is a frame image before m frames, and m is greater than 1 and less than 5.

12. A driving method of a display device, wherein the driving method comprises following steps:

step S100: acquiring a first image information and a second image information, wherein the first image information is image information of a current frame image, and the second image information is image information of a frame image before the current frame image;

step S200: determining whether the current frame image belongs to a dynamic image according to the first image information and the second image information;

step S300: determining whether the current frame image is a heavy load image according to the image information of the current frame image in the dynamic image, and acquiring pixel information of a heavy load sub-pixel in the heavy load image; and step S400: performing a grayscale energy-saving driving on a corresponding heavy load sub-pixel according to the image information of the heavy load image;

wherein in the step S300, the step of determining whether the current frame image is the heavy load image according to the image information of the current frame image in the dynamic image and acquiring the pixel information of the heavy load sub-pixel in the heavy load image comprises:

step S310: calculating a heavy load weight per pixel of the current frame image, wherein the calculation formula of the heavy load weight is expressed as:

$$W_N = \Sigma_{k=0}^{N} |(R(i,j+k)-R(i+1,j+k)|+|G(i,j+k)-G(i+1,j+k)|+|B(i,j+k)-B(i+1,j+k)|$$

$$W_N > 3*NP, P \in (0,255), N > 30$$

wherein $W_N$ is a heavy load weight, i represents an i-th row pixels, i+1 represents an (i+1) row pixels, j represents a j-th column pixels, and j+k represents a (j+k)-th column pixels; R denotes a grayscale value of a red sub-pixel, G denotes a grayscale value of a green sub-pixel, B denotes a grayscale value of a blue sub-pixel, N denotes a range of pixel columns for calculating the heavy load weight, P denotes a grayscale difference, k is a positive integer, and 3*NP denotes a heavy load threshold; and step S320: comparing the heavy load weight of each pixel with the heavy load threshold, wherein when the heavy load weight of the pixel is greater than the heavy load threshold, the pixel is the heavy load pixel; when the heavy load weight of the pixel is less than or equal to the heavy load threshold, the pixel is a non-heavy load pixel; and acquiring the pixel information of the heavy load sub-pixels in the heavy load pixel.

13. The driving method of the display device according to claim 12, wherein a value of P is greater than or equal to (255*2)/3.

14. The driving method of the display device according to claim 12, wherein a value of N is greater than or equal to 30 and the value of N is less than or equal to 120.

* * * * *